United States Patent
Pickett et al.

(10) Patent No.: US 11,160,307 B2
(45) Date of Patent: Nov. 2, 2021

(54) CALIBRATED ANTI-SPILL DOSING APPLICATOR

(71) Applicant: Cloud Candy LLC, Simi Valley, CA (US)

(72) Inventors: Peter James Pickett, Simi Valley, CA (US); Tyler Mitchell Pickett, Simi Valley, CA (US); Colby Joseph Pace, Simi Valley, CA (US)

(73) Assignee: CLOUD CANDY LLC, Simi Valley, CA (US)

( * ) Notice: Subject to any disclaimer, the term of this patent is extended or adjusted under 35 U.S.C. 154(b) by 141 days.

(21) Appl. No.: 16/431,307

(22) Filed: Jun. 4, 2019

(65) Prior Publication Data

US 2020/0154764 A1    May 21, 2020

Related U.S. Application Data

(60) Provisional application No. 62/768,084, filed on Nov. 15, 2018.

(51) Int. Cl.
　*A24F 9/00* 　　(2006.01)
　*G01F 19/00* 　(2006.01)

(52) U.S. Cl.
　CPC .............. *A24F 9/00* (2013.01); *G01F 19/002* (2013.01)

(58) Field of Classification Search
　CPC ................................ A24F 9/00; G01F 19/002
　USPC ........................................................ 141/109
　See application file for complete search history.

(56) References Cited

U.S. PATENT DOCUMENTS

| | | | | |
|---|---|---|---|---|
| 149,833 | A * | 4/1874 | Brown et al. | A47G 21/004 30/125 |
| 569,831 | A * | 10/1896 | Hurlburt | A47G 21/004 30/125 |
| 5,540,623 | A * | 7/1996 | Symonds | A63B 37/0002 16/111.1 |
| 7,661,310 | B2 * | 2/2010 | De Laforcade | G01F 19/002 73/429 |
| 8,387,263 | B1 * | 3/2013 | Roberts | A47G 21/04 30/324 |

(Continued)

OTHER PUBLICATIONS

The Design of Steel, 3V Venosta, 3V di Venosta Armanno e F.lli Snc, https://web.archive.org/web/20150208141704/http://www.forksandspoons.it/materials.shtml (Year: 2015).*

*Primary Examiner* — Eric Yaary
*Assistant Examiner* — Russell E Sparks
(74) *Attorney, Agent, or Firm* — Cislo & Thomas, LLP

(57) ABSTRACT

An applicator made from stainless steel comprising an elongated handle, a chamber, and a blade. The handle having a longitudinal axis and comprising a first end and a second end, a first section, a second section, a third section, and a fourth section, each in substantial alignment along the longitudinal axis of the handle. The chamber is substantially cylindrical and is coupled to the first end of the handle for collecting a calibrated volume of material. The chamber has an open end distal to the first end of the handle and a closed end proximate the first end of the handle, and is in substantial alignment with the longitudinal axis of the handle. The blade is coupled to the second end of the handle, the blade having a curved profile and a tip with a rounded facial contour, and being in substantial alignment with the longitudinal axis of the handle.

16 Claims, 5 Drawing Sheets

A

(56) References Cited

U.S. PATENT DOCUMENTS 10,548,765 B2 * 2/2020 Fateh ................... A61F 9/0008
10,584,993 B2 * 3/2020 Rivera ................. G01F 19/002

* cited by examiner

CALIBRATED ANTI-SPILL DOSING APPLICATOR

CROSS-REFERENCE TO RELATED APPLICATION

This patent application claims the benefit of U.S. Provisional Patent Application Ser. No. 62/768,084 entitled "Calibrated Anti-Spill Dosing Applicator," filed Nov. 15, 2018, which application is incorporated in its entirety herein by this reference.

TECHNICAL FIELD

This invention relates to a calibrated anti-spill dosing applicator that comprises an elongated handle with an open-ended chamber at one end and a blade at the other.

BACKGROUND

Many users desire to smoke/consume marijuana concentrates, for either recreation or medicinal purposes. Medical marijuana is usually dispensed in the form of a concentrate such as an oil, sauce, butter, or crumble. These concentrates typically come with a dosage recommendation, but currently there is no way to accurately and consistently measure a dose, and inconsistent dosage can be dangerous.

Accordingly, there is a need to provide an apparatus that allows a user to calibrate and measure a proper dose of a material, and also prevent waste of the material.

SUMMARY

In one embodiment, the invention described herein is directed to an instrument or applicator comprising a handle having a longitudinal axis, a substantially cylindrical chamber coupled to the first end of the handle for collecting a calibrated volume of material, the chamber having an open end distal to the first end of the handle and a closed end proximate the first end of the handle, and a blade coupled to the second end of the handle, the blade having a curved profile and a tip with a rounded facial contour.

Optionally, the handle has a first end and a second end, and a first section, a second section, a third section, and a fourth section, each in substantial alignment along the longitudinal axis of the handle.

The first section can be proximate the first end and the fourth section can be proximate the second end, wherein the second and third sections are between the first and fourth sections. The first section is substantially cylindrical in shape with a diameter smaller than a diameter of the second section. The second section is substantially cylindrical in shape with a diameter greater than a diameter of the first and third sections. The third section is substantially cylindrical in shape with a diameter that is smaller than a diameter of the second section, and the fourth section has a diameter that tapers in thickness from one end to another.

Optionally, the applicator can be made from stainless steel.

Optionally, the chamber is in substantial alignment with the longitudinal axis of the handle and the blade is in substantial alignment with the longitudinal axis of the handle.

Optionally, the chamber is removably coupled to the handle and the blade is removably coupled to the handle.

Optionally, the chamber has a diameter greater than a depth of the chamber.

In another embodiment, the present invention is directed to a method of using the applicator. The method comprises the steps of: a) grasping the handle of the applicator with one hand; b) grasping a container containing material with another hand; c) pressing the chamber of the applicator into the material within the container such that material is lodged into the chamber; d) moving an edge of the chamber along an edge of an open end of the container to level the material contained within the chamber to produce a calibrated volume of material; and e) applying the chamber with material contained therein to a heat source to remove the material from the chamber.

The invention as disclosed herein is an instrument comprising a calibrated collection chamber portion attached to a handle portion. The chamber, which may be cylindrical or polygonal in cross-sectional shape at its top opening, of varying depths depending on the dosage amount desired, and is preferably made of metal or other heat conducting and heat tolerant material. The chamber is oriented with respect to the handle portion to facilitate pressing an open end of the chamber into a source of material that is preferably stiff, sticky, highly viscous, or otherwise similarly characterized such that a portion of the material becomes lodged in the chamber and is resistant to becoming dislodged. The open end of the chamber may be pressed to the bottom of the source container or scraped against an edge of the container to level the loaded portion of material relative to the chamber opening, thus providing a calibrated volume of material. The calibrated sample is then removed from the chamber by application and transfer of heat from a receiver to the chamber for melting, loosening, reducing viscosity, etc., of the material, particularly where it is in contact with the chamber walls, such that the material becomes inclined to ooze, run, flow, or fall from the chamber.

Another aspect of the invention as disclosed herein is the inclusion of a blade portion at an end of the instrument opposite the chamber. The blade is preferably also made of metal or other heat conducting and heat tolerant material, and may be curved and become thinner toward its tip to facilitate scooping and scraping of material from corners, crevices, and bottom recesses of a container. As has been described for the chamber, material may be removed from the blade by application and transfer of heat to the blade.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
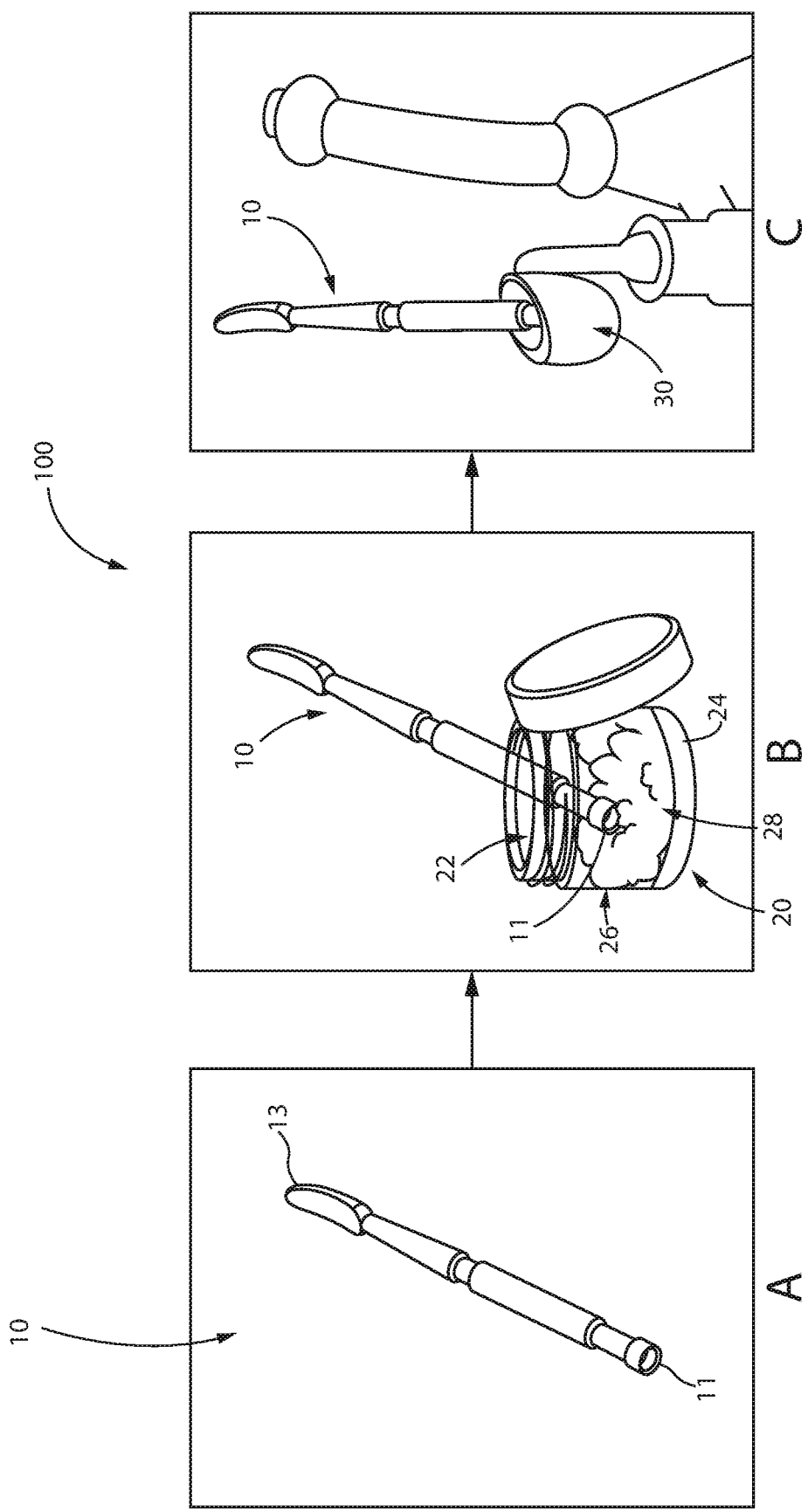
FIG. 1A is shows an applicator having features of the present invention.
FIG. 1B shows the applicator of FIG. 1A being used with a preferred container to remove a calibrated volume of material from the container.
FIG. 1C shows the applicator of FIG. 1A depositing the calibrated volume of material on a heated receiving surface.

Referring now to FIGS. 1A-1C, there is shown a system 100 having features of the present invention. The system 100 comprise an applicator 10, shown in FIG. 1A, a preferred container 20, shown in FIG. 1B, and a heated receiving surface 30, shown in FIG. 1C. The applicator 10 is shown in greater detail in FIGS. 2-4.

Figure 2:
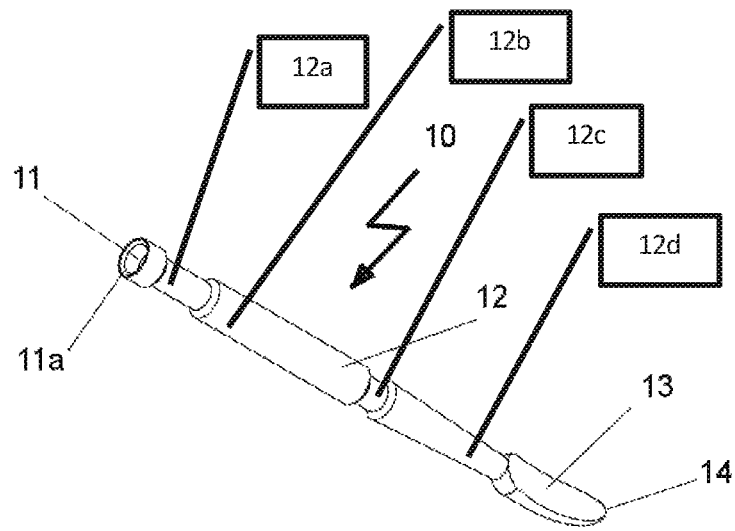
FIG. 2 a perspective view of an applicator having features of the present invention.
Figure 3:
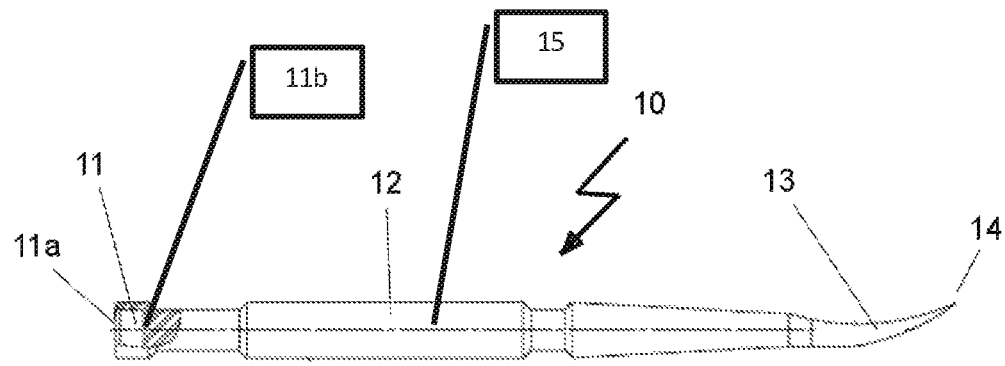
FIG. 3 is a side plan view of the applicator of FIG. 1.
Figure 4:
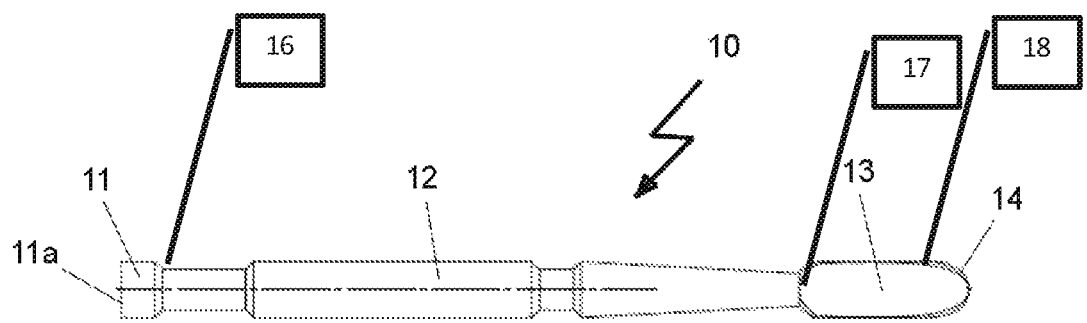
FIG. 4 is a top plan view of the applicator of FIG. 1.

Referring now to FIGS. 2-4, there is shown an applicator 10 having features of the present invention. The applicator, or instrument 10 includes a chamber 11 coupled to a first end 16 of an elongated handle 12 and a spatula blade 13 coupled to a second end 17 of the handle 12. The handle portion 12 has a longitudinal axis 15 extending along its length and can comprise one or more sections. As shown in FIGS. 2-4, the handle 12 comprises a first section 12a, a second section 12b, a third section 12c, and a fourth section 12d, wherein all four sections are in alignment along the longitudinal axis of the handle 12. The first section 12a is proximate the first end 16 of the handle 12 and the fourth section 12d is proximate the second end 17 of the handle 12, where the second and third sections 12b, 12c are between the first and fourth sections 12a, 12d. The first section 12a is cylindrical in shape with a diameter smaller than a diameter of the second section 12b. The second section 12b is cylindrical in shape with a diameter greater than a diameter of the first and third sections 12a, 12c. The third section 12c is cylindrical in shape with a diameter that is smaller than a diameter of the second section 12b and the fourth section 12d has a diameter that tapers in thickness from one end to another.

The chamber 11 is preferably, but not necessarily, greater in diameter than depth. The size of the chamber portion 11 determines the dose or amount of material 28 that can be collected by the chamber 11. As user can have different applicators 10 with different-sized chambers 11 that correspond to different dosage amounts, allowing the user to accurately and consistently consume, or inhale the combusted product of, a calibrated dose of material 28.

Preferably the chamber 11 is cylindrical, having an open end 11a and a closed end 11b, although the chamber 11 could be shaped like a cube, rectangular prism, hexagonal prism, octagonal prism, or something similar. The preferred orientation of the chamber portion 11 is to be generally in alignment with the longitudinal axis 15 of the handle 12, with the open end 11a being distal the first end 16 of the handle 12. The closed end 11b can either comprise a flat surface or a slightly inclined from top to bottom surface.

The chamber 11 is configured to prevent spilling of material 28 contained therein because of its size. The chamber 11 is small enough that even if the material 28 is a sauce-like consistency, the chamber 11 provides enough surface tension to retain the sauce (or material 28) within the chamber 11.

As noted above, the chamber 11 allows collection of a calibrated volume of material 28 from the container 20, shown in FIG. 1B. The container 20 may be cylindrical in shape, with an open top 22, closed bottom 24, and curved side walls 26. As shown in FIG. 1B, the chamber 11 is pushed into a mass of material 28 within the container 20. Material 28 to be collected will preferably have a stiff, sticky, viscous, gooey or similar consistency whereby a plug of the material 28 will become securely lodged within the chamber 11, much as a soil sample becomes lodged in a soil coring tool. Unlike a soil coring tool, the chamber 11 has no side openings, and no removable top (or bottom) or similar means to allow a user to push the sample back out of the chamber 11. In order to achieve a calibrated volume, the material 28 lodged within the chamber 11 may be leveled to the open end 11a of the chamber 11 by pressing or dragging a peripheral edge of the open end 11a of the chamber against a surface or edge such as the container bottom 1ib or a peripheral edge of the container opening 22.

The blade portion 13 is curved in profile as illustrated in FIG. 3, and has a tip 14 with a rounded facial contour as illustrated in FIG. 4. The preferred orientation of the blade 13 is to be generally in alignment with the longitudinal axis 15 of the handle 12, with the tip 14 being distal the second end 17 of the handle 12. The blade 13 tapers in thickness from the second end 17 to the tip 14, wherein the second end 17 is thicker than the tip 14. This can be seen in FIGS. 1 and 3.

In use, the blade 13 is adapted to conform with the preferred container 20, described above, in several ways. Preferably, the blade 13 has a length that is greater than a height of the container's 20 interior surface of the side wall 26 such that the blade 13 may extend across the entirety of the height of the inside surface of the side wall 26 of the container 20, whereby the tip 14 may contact the container bottom 24 while a side edge 18 of the blade 13 contacts the full height of the container's side wall 26. The profile curvature of the blade 13 and the blade's 13 facial contour allow maximal contact between the blade 13 and the side walls of the container for highly efficient collection of material therefrom.

For collection of material 28 from a near empty container 20, the blade portion 13 may be applied to the bottom and side interior surfaces of the side walls 26 of the container 20, and the surfaces may be thoroughly scraped.

For release of material 28 from the chamber 11 or blade 13, the chamber 11 or the blade 13 is laid against a heated receiver surface 30, shown in FIG. 1C, so that heat transfer from the receiver surface 30 to the chamber 11 or the blade 13 warms the material 28 collected therein. The device 10 is intended for use with materials 28 that become less adherent to the applicator 10 when warmed, as by becoming softer or less viscous or the like. A user may control and meter the release of material 28 from the device 10 to a receiver 30 by modulating the duration of contact between the applicator 10 and the heated receiver surface 30.

Thus far herein, the applicator 10 has been described in general terms regarding materials 28 for which it is useful. In more particularity, the instrument 10 is useful in preparing and dispensing measured volumes or dosages of marijuana concentrates onto a receiver such as a heated surface 30 of a vaporizing device. Such materials 28 are typically expensive, and simple bladed "dabbing" tools as are known in the art do not provide measurement capability, which leads to waste, and are also prone to accidental loss of material through spilling, dropping, dripping or inadvertent wiping. The chamber 11 allows collection and dispensing of a substantially calibrated volume of sticky, gooey or semi-liquid concentrates, and substantially prevents or reduces the risk of accidental loss of such materials. In the process of collection, the concentrate material 28 must be forcibly pushed into the chamber 11 where the material 28 will stay lodged, at least for a short period of time, in the absence of picking or prying forces or a change in material consistencies via application of heat. In the case of the collected material 28 being marijuana concentrates, the heated "receiver" 30 will typically comprise a bowl or a "nail" of a vaporizer, which may be heated electrically or by application of a flame or fire source.

With judicious application of heat to the receiver 30 (e.g., keeping the receiver temperature at a lower end of a usable range) and controlled contact duration between the chamber 11 and the receiver 30, a user can achieve generally predictable and repeatable release of partial volumes of material 28 from the chamber 11. Thus, because the chamber 11 is configured to hold a calibrated volume, a user may choose to modulate the duration of contact between the receiver 30 and the applicator chamber 11 in order to selectively release a fairly predictable fractional dosage from that volume. This method of low temperature, slow release of material 28 prevents unwanted burning of the material 28, which helps preserve the flavor and possibly the compounds within the material 28 as well.

At some point as a container 20 of marijuana concentrate becomes near empty, the chamber 11 typically is rendered inefficient at removal of material 28. To address the issue, the instrument 10 is equipped with the blade portion 13 for thorough and efficient collection of valuable concentrate residues (material 28) from the container 20. The profile curvature of the blade 13 as depicted in FIG. 3 provides some resistance to loss, although not to the same degree as the chamber 11.

The chamber 11 and blade 13 may be permanently affixed to the handle 12 or one or both may be removably coupled to the handle 12, such as by magnets or threaded, or friction fit mechanism, or a snap mechanism. In such a case the applicator 10 may include multiple chambers 11 of different calibrated volumes to provide for specific dosage requirements and measurement capabilities and multiple blades 13 of different lengths and sizes to accommodate different sized containers 20.

The applicator 10 can be made of a metal or alloy preferably having the characteristics of relatively low malleability or deformability, relatively low heat transfer characteristics, and relatively inexpensive; although virtually any metal or alloy can conceivably be used. For example and not for purposes of limitation, aluminum may not be most preferred because it is too efficient at heat transfer (meaning it gets too hot, potentially burning the material contained therein) and can deform in the molding process. Also, by way of example and not limitation, titanium may not be most preferred because it is expensive and too efficient at heat transfer. Stainless steel works for the intended purpose of the invention.

If the material 28 contained in the applicator 10 is burned, this can affect the taste of the material and can potentially affect the quality of the material as well.

Figure 5:
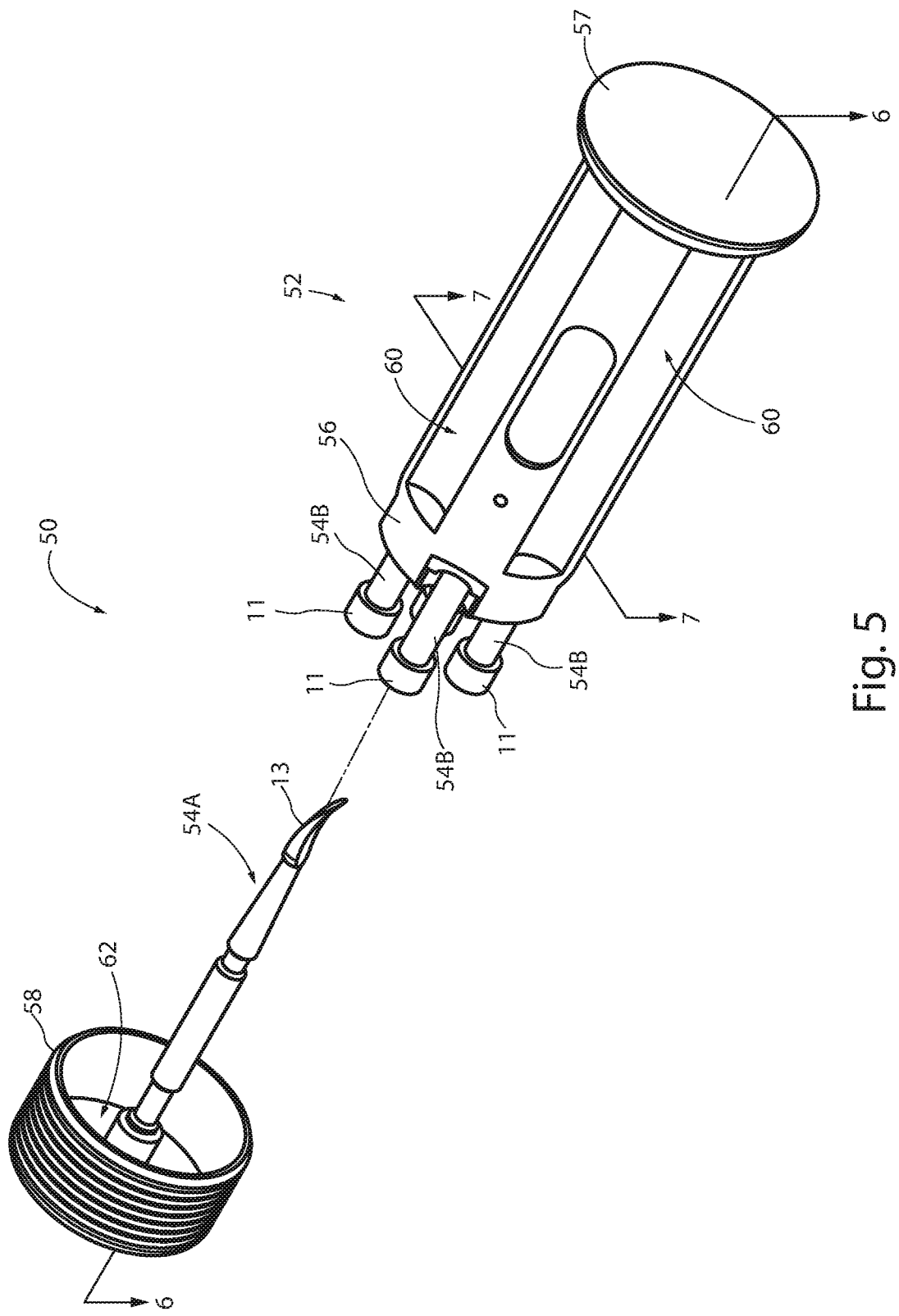
FIG. 5 is a perspective view of a system having features of the present invention, wherein the system comprises multiple applicators stored inside a storage container, wherein a cap of the storage container is separated from a body of the storage container.
Figure 6:
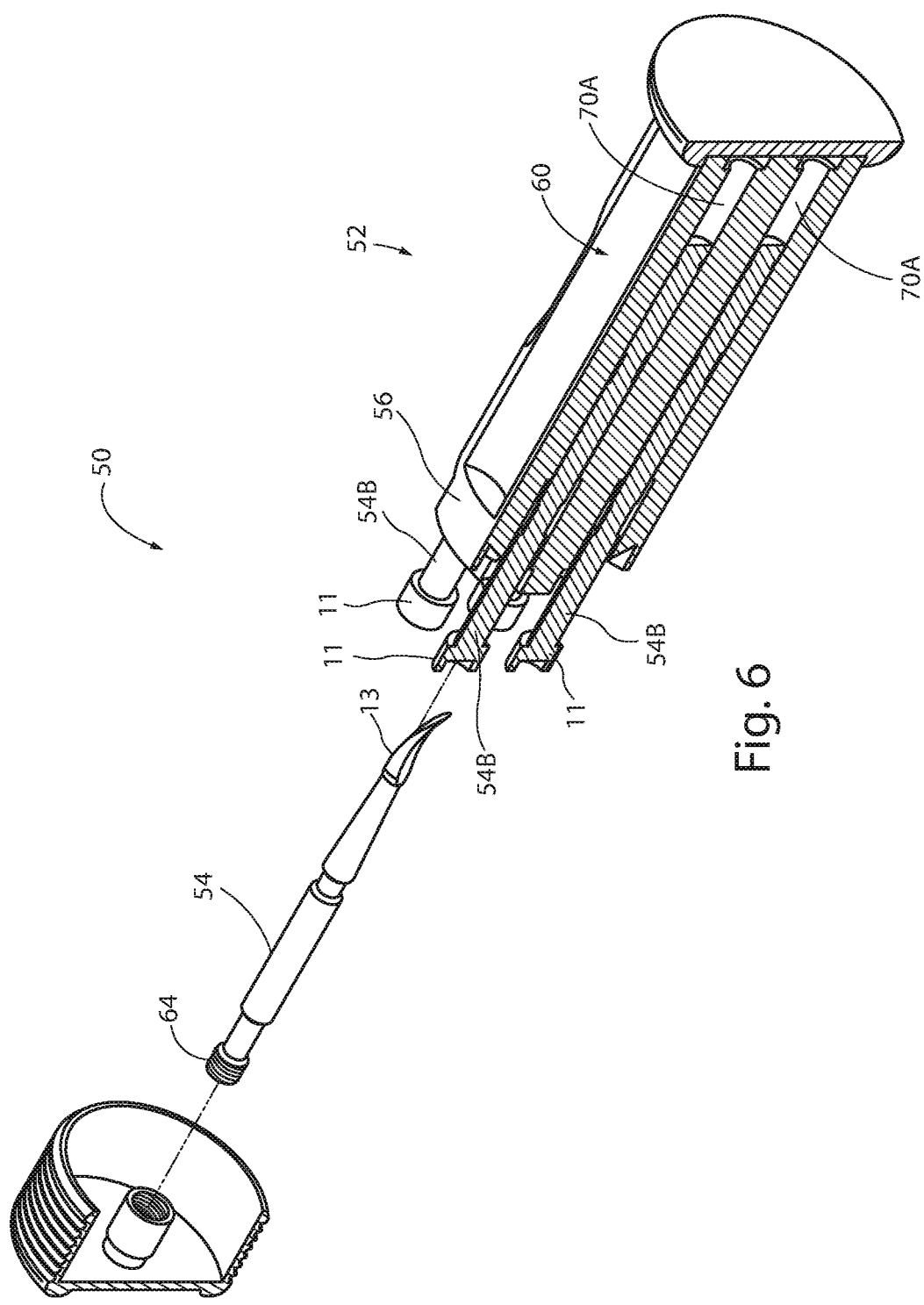
FIG. 6 is a sectional view of the system according to FIG. 5, taken along line 6-6.
Figure 7:
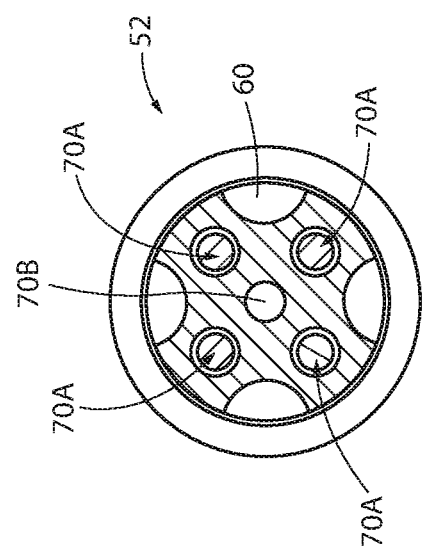
FIG. 7 is a sectional view of the system according to FIG. 5, taken along line 7-7.

Referring now to FIGS. 5-7, there is shown a system 50 having features of the present invention. The system 50 comprises a storage container or enclosure 52 within which multiple applicators 54 can be stored. The storage container 52 has a body 56 with a removable cap 58. In the Figures, the body 56 is shown as roughly cylindrical in shape with a longitudinal axis extending along its length and elongated indents 60 spaced equally around an outside surface of the body 56. However, the body 56 shape shown is just an example, and the body 56 can be any shape.

The body 56 has a base 57, and as shown in FIGS. 6 and 7, a plurality of cylindrical cavities 70A, 70B that extend along the longitudinal axis of the body 56. Typically, there are four cavities 70A equally spaced around a perimeter of the body 56, and single, centrally located cavity 70B. Each of the five cavities 70 are configured to hold a single applicator 54 in each one. Optionally, there can be more than four perimeter cavities 70A or less than four perimeter cavities 70A. The cavities 70 each have a length long enough and a diameter wide enough to accommodate a corresponding applicator 54 retained therein.

FIGS. 5 and 6 show the cap 58 of the enclosure 52 separated from the body 56 of the container 52. Removably coupled to an interior surface 62 of the cap 58 is an applicator 54A. The applicator 54A coupled the cap 58 comprises a blade 13 at one end and a removable coupling means 64 at an other end. In the embodiment shown in FIG. 6, the removable coupling means 64 comprises threading disposed around an end of the applicator 54A that allows the applicator 54A to be threadedly coupled to the cap 58. Alternatively, the removable coupling means 64 could comprise magnets, a friction fitting, or a snap fitting to removably couple the applicator 54A to the cap 58. When the cap 58 is coupled to the body 56 of the container 52, the blade applicator 54A that is coupled to the cap 58 is inserted into the central cavity 70B of the body 56.

As best seen in FIGS. 5 and 6, the four applicators 54B that are housed within the perimeter cavities 70A of the body 56 each comprise a single chamber 11 disposed at one end. Preferably, but not necessarily, the chamber 11 size of each of the four applicators 54B are be different so that the system 50 comprises four different dosing options. Exemplary dosing options are 0.05 gram, 0.1 gram, 0.2 gram and 0.3 gram.

The foregoing description of the preferred embodiment(s) of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. An applicator made from stainless steel comprising
a) a straight, elongated handle having a longitudinal axis and comprising:
   i) a first end and a second end;
   ii) a first section, a second section, a third section, and a fourth section, each in substantial alignment along the longitudinal axis of the handle;
   the first section being proximate the first end and the fourth section being proximate the second end, wherein the second and third sections are between the first and fourth sections;
   the first section being substantially cylindrical in shape with a diameter smaller than a diameter of the second section;
   the second section being substantially cylindrical in shape with a diameter greater than the diameter of the first second and a diameter of the third section;

the third section being substantially cylindrical in shape with the diameter that is smaller than the diameter of the second section; and the fourth section having a diameter that tapers in thickness from one end to another;

b) a chamber coupled to the first end of the handle for collecting a calibrated volume of material, the chamber having an open end distal to the first end of the handle and a closed end proximate the first end of the handle, the open end of the chamber being perpendicular to the longitudinal axis of the handle; and c) a blade coupled to the second end of the handle, the blade having a curved profile and a tip with a rounded facial contour, the blade being in substantial alignment with the longitudinal axis of the handle.

2. The applicator of claim 1, wherein the chamber is removably coupled to the handle.

3. The applicator of claim 1, wherein the blade is removably coupled to the handle.

4. The applicator of claim 1, wherein the chamber has a diameter that is greater than a depth of the chamber.

5. An applicator comprising:
a) a straight handle having a longitudinal axis and comprising:
   i) a first end and a second end;
   ii) a first section, a second section, a third section, and a fourth section;
   the first section being proximate the first end and the fourth section being proximate the second end, wherein the second and third sections are between the first and fourth sections;
   the first section being substantially cylindrical in shape with a diameter smaller than a diameter of the second section;
   the second section being substantially cylindrical in shape with a diameter greater than the diameter of the first section and a diameter of the third section;
   the third section being substantially cylindrical in shape with the diameter that is smaller than the diameter of the second section; and
   the fourth section having a diameter that tapers in thickness from one end to another;
b) a chamber coupled to the first end of the handle for collecting a calibrated volume of material, the chamber having an open end distal to the first end of the handle and a closed end proximate the first end of the handle, the open end of the chamber being perpendicular to the longitudinal axis of the handle; and
c) a blade coupled to the second end of the handle, the blade having a curved profile and a tip with a rounded facial contour.

6. The applicator of claim 5 is made from stainless steel.

7. The applicator of claim 5, wherein the chamber is in substantial alignment with the longitudinal axis of the handle.

8. The applicator of claim 5, wherein the blade is in substantial alignment with the longitudinal axis of the handle.

9. The applicator of claim 5, wherein the chamber is removably coupled to the handle.

10. The applicator of claim 5, wherein the blade is removably coupled to the handle.

11. The applicator of claim 9, further comprising a plurality of chambers removably coupleable to the handle, wherein the calibrated volume of each of the plurality of chambers is different, and wherein the chamber removably coupled to the handle is one of the plurality of chambers.

12. A method of using the applicator of claim 5, the method comprising the steps of:
a) grasping the handle of the applicator with one hand;
b) grasping a container containing the material with an other hand;
c) pressing the chamber of the applicator into the material within the container such that the material is lodged into the chamber;
d) moving an edge of the chamber along an edge of an open end of the container to level the material contained within the chamber to produce the calibrated volume of material; and
e) applying the chamber with the material contained therein to a heat source to remove the material from the chamber.

13. A method of using the applicator of claim 10, the method comprising the steps of:
a) grasping the handle of the applicator with one hand;
b) grasping a container containing the material with an other hand;
c) pressing the chamber of the applicator into the material within the container such that the material is lodged into the chamber;
d) moving an edge of the chamber along an edge of an open end of the container to level the material contained within the chamber to produce the calibrated volume of material; and
e) applying the chamber with the material contained therein to a heat source to remove the material from the chamber.

14. An applicator comprising:
a) a straight handle having a longitudinal axis and comprising:
   i) a first section, a second section, a third section, and a fourth section;
   the first section being proximate a first end and the fourth section being proximate a second end, wherein the second and third sections are between the first and fourth sections;
   the first section being substantially cylindrical in shape with a diameter smaller than a diameter of the second section;
   the second section being substantially cylindrical in shape with a diameter greater than the diameter of the first section and a diameter of the third section;
   the third section being substantially cylindrical in shape with the diameter that is smaller than the diameter of the second section; and
   the fourth section having a diameter that tapers in thickness from one end to another;
b) a chamber coupled to a first end of the handle for collecting a calibrated volume of material, the chamber having an open end distal to the first end of the handle and a closed end proximate the first end of the handle, the open end of the chamber being perpendicular to the longitudinal axis of the handle; and
c) a blade coupled to the second end of the handle, the blade having a curved profile and a tip with a rounded facial contour.

15. The applicator of claim 14, wherein the chamber is removably coupled to the handle.

16. The applicator of claim 14, wherein the blade is removably coupled to the handle.

* * * * *